April 6, 1948.   C. H. SMITH, JR   2,438,950
PULSE FREQUENCY MODULATION
Filed April 18, 1944   2 Sheets-Sheet 1
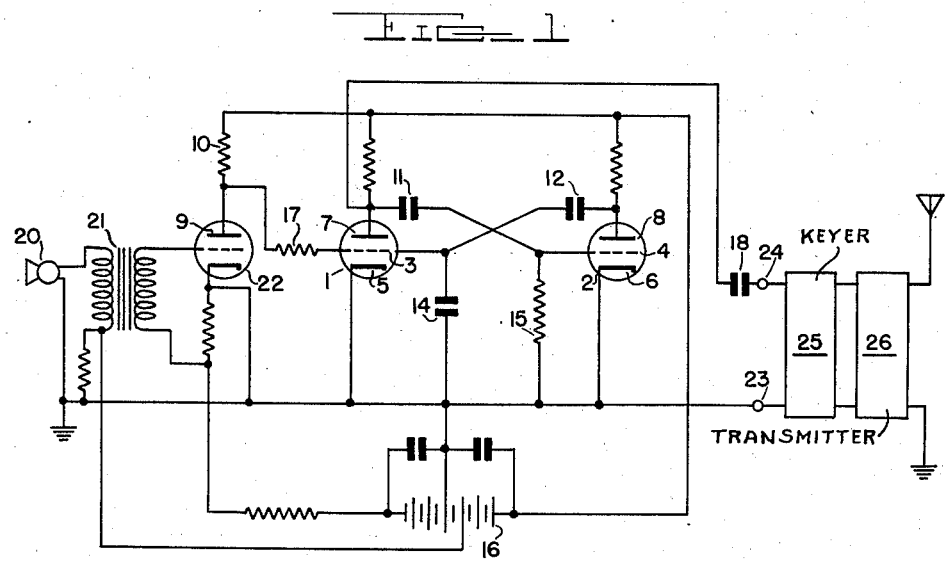
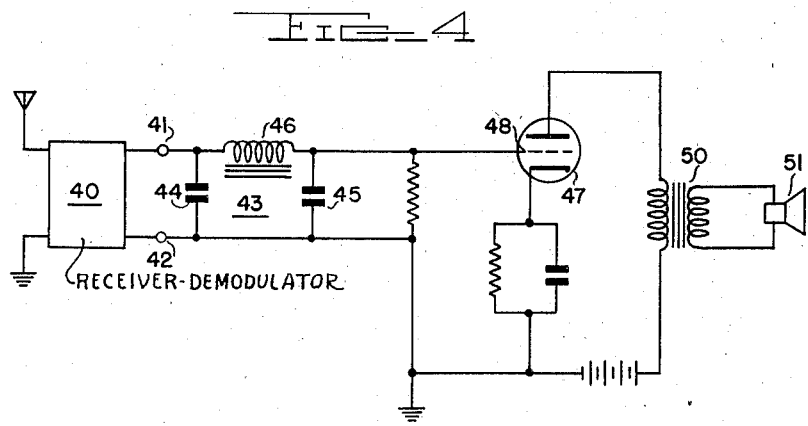
Inventor
C. H. SMITH JR.
By W Glenn Jones
Attorney April 6, 1948.  C. H. SMITH, JR  2,438,950
PULSE FREQUENCY MODULATION
Filed April 18, 1944  2 Sheets-Sheet 2
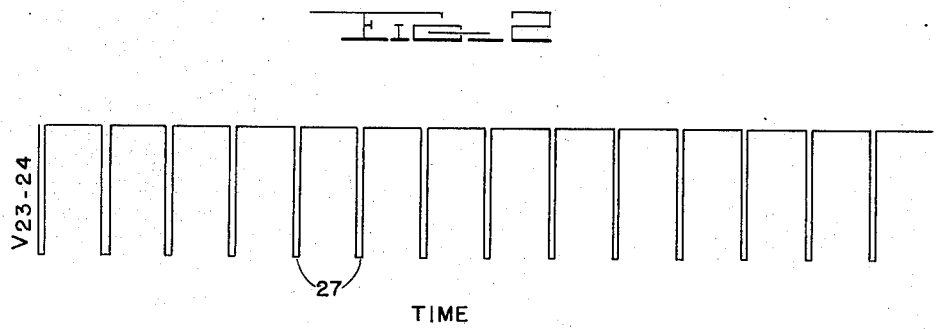
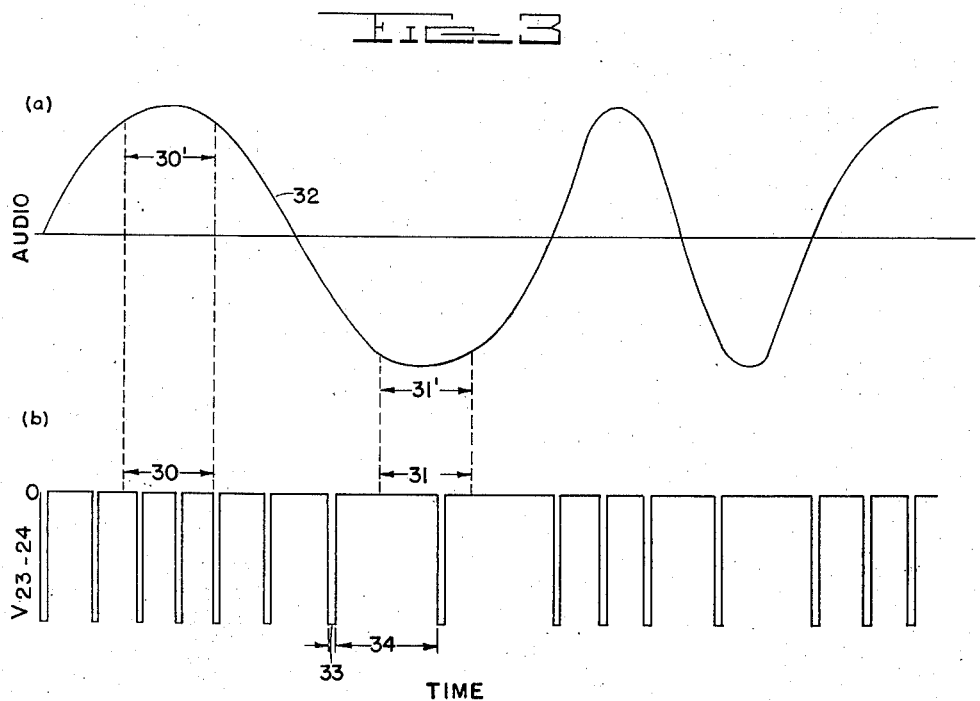
Inventor
C. H. SMITH JR.
By W. Glenn Jones
Attorney Patented Apr. 6, 1948

2,438,950

UNITED STATES PATENT OFFICE 2,438,950

PULSE FREQUENCY MODULATION

Carl Harrison Smith, Jr., Washington, D. C.

Application April 18, 1944, Serial No. 531,593

3 Claims. (Cl. 179—171.5)

(Granted under the act of March 3, 1883, as amended April 30, 1928; 370 O. G. 757)

This invention relates to a transmission system involving generation and reception of pulses of electrical energy; and more particularly to a means and method for controlling the repetition frequency of such pulses, whereby intelligence may be transmitted over the system.

Transmission systems are known in which pulses of electrical energy of short duration are generated having a substantially rectangular wave form. Such pulses may be used to key or trigger a radiant energy transmitter, thus causing the emanation of radiant energy pulses having an envelope pattern corresponding to the wave form of the triggering pulses. Upon reception and first detection, the pulses are recreated from the envelope pattern of the received wave.

Among the objects of the invention are:

To produce a means for easily varying and controlling the repetition rate of electrical pulses while retaining a substantially constant pulse duration or width.

To devise a circuit for causing variation in the frequency of pulses generated by a multivibrator without varying the pulse width.

To produce a means and method for modulating the repetition rate of electrical pulses with intelligence such as audio signals; and also a means and method for demodulating the pulses and recreating the modulating signals at the receiving end of the transmitting system.

By way of example, an embodiment of the invention is shown in the drawings in which:

Fig. 1 shows the subject of this invention applied to a radiant energy transmission system which is keyed by a multivibrator circuit;

Fig. 2 illustrates the wave form of pulses normally generated by the multivibrator of Fig. 1 when no modulating signals are being applied;

Fig. 3 illustrates the modulating action which takes place in the multivibrator of Fig. 1;

Fig. 4 shows a circuit for receiving and demodulating the signals produced by the circuit of Fig. 1 to recreate the intelligence transmitted over the system.

The multivibrator of Fig. 1 comprises triodes 1 and 2 having grids 3 and 4, cathodes 5 and 6, and anodes 7 and 8, respectively. Each anode is connected to the grid of the opposite tube through capacitors 11 and 12, respectively. The ground connection for grid 4 is provided through resistor 15, while the ground connection for grid 3 is provided through resistor 17 and tube 22. Anodes 7 and 8 are connected to the positive terminal of battery 16 through plate resistors, as shown. The output of the multivibrator circuit is taken from anode 7 of tube 1 through capacitor 18 to terminals 23 and 24. This output is fed to a keying circuit 25 which inverts the signal and triggers a radiant energy transmitter 26. Transmitter 26 thus produces pulses of radiant energy having envelopes corresponding to the pulses applied to terminals 23 and 24.

Circuit means are provided for supplying a variable bias to grid 3 of multivibrator tube 1 through resistor 17 for effecting frequency modulation of the pulse output. This variable bias may consist of an audio intelligence signal originated in microphone 20 and coupled to amplifier tube 22 through transformer 21. The output of tube 22 is fed through resistor 17 to grid 3 of multivibrator tube 1.

If no voice signal is supplied by microphone 20, no audio voltage will appear on grid 3 of tube 1; and the multivibrator tubes 1 and 2 will alternately pass and block current. This will produce a pulse-shaped wave of voltage across terminals 23 and 24 approximately of the wave form illustrated in Fig. 2. The negative pulses 27 of Fig. 2 are produced whenever tube 1 is conducting. It will be noted that the blocking periods between pulses 27, corresponding to the nonconducting periods of tube 1, are considerably longer than the duration of the pulses themselves. The ratio between the duration of the blocking period and the duration of the pulse may be in the order of $10^4$ to 1.

The asymmetry of the output waveform is produced by selection of the RC components in each grid circuit upon which the lengths of the blocking periods of the respective tubes are dependent. Thus, the RC time constant of components 11 and 15 may be of the order of $10^{-7}$ secs., whereas the RC time constant of the network feeding grid 3 may be about $10^{-3}$ secs.

The basic multivibrator circuit of Fig. 1 is therefore effective to produce in tube 1 a series of short conduction periods interrupted by long blocking periods. The frequency of the negative output pulses is controlled without variation in their waveform by the application of an audio signal to grid 3 of tube 1. For this purpose, grid 3 is returned through series current limiting resistor 17 to anode 9 of audio output tube 22. The potential of the grid return under this direct coupling is therefore a positive bias determined by the voltage divider action of resistor 10 and tube 22, upon which is superimposed the audio signal from transformer 21.

The magnitude of resistor 17, which may be several megohms, is sufficient to establish a relatively large potential drop across 17 upon flow of grid current in tube 1, thus preventing grid 3 from assuming high positive voltage levels with respect to cathode 5. Consequently, although the multivibrator is asymmetrical, it is free running, since the negative drop established at anode 8 of tube 2 when this tube goes into conduction far over-rides the relatively small voltage control effected on grid 3 by the positive grid return, while this tube is in conduction. It will further appear below that the effect of the positive grid return is negligible during the conduction period.

During the blocked period of tube 1, however, the critical factor determining the resumption of conduction is the potential of the grid return. Assuming that tube 2 goes into conduction, the negative voltage drop at anode 8 is applied through condenser 12 to grid 3, the charge dividing across condensers 12 and 14 inversely in proportion to their capacities. It will be apparent that condenser 14 functions primarily to increase the time constant of the controlling circuit of grid 3, and to a proportionate extent to decrease the negative voltage drop established on grid 3 to block tube 1. Neither function is indispensable to the operation of the circuit.

Inasmuch as during conduction of tube 1, the positive voltage on grid 3 with respect to cathode 5 is small compared with the magnitude of the negative blocking pulse transmitted by condenser 12 on conduction of tube 2, grid 3 is driven to a certain, relatively large, negative voltage whenever tube 1 is blocked. The blocking defines the inauguration of the non-conducting period of tube 1. The period terminates when grid 3 reaches a conducting potential, which occurs when condensers 14 and 12 discharge sufficiently. The discharge of condensers 14 and 12 is effected by current through resistor 17. This current is, in turn, dependent upon the potential at anode 9 of tube 22 which determines the voltage drop across resistor 17. Consequently, the length of the blocking period is controlled by the audio signal. Thus, frequency modulation of the negative pulses at anode 7 is obtained.

It remains to be shown that the negative pulses are of substantially uniform waveform. This is due to the extremely short time constant of the grid circuit of tube 2. This tube is blocked when grid 3 of tube 1 reaches conduction level and the potential of anode 8 rises abruptly. Grid 3 of tube 1 is driven positive and, except for grid current, would tend to reach potentials of the order of that of anode 7 when conduction exists in tube 1. This drives tube 1 to cathode emission saturation. Tube 2 unblocks while this saturation is maintained, due to the short time constant of the controlling circuit of grid 4, and therefore the current in tube 1 shifts abruptly back from saturation to cutoff. It is also apparent that during saturated conduction in tube 1, the effect of the positive grid return is entirely over-ridden by the control voltage from anode 8 of tube 2.

It is to be noted that constant pulse width is not obtained where the conduction time of tube 1 is sufficiently long to extend substantially beyond the period of cathode emission saturation, because in such case the audio signal on the positive grid return directly controls the anode current toward the end of the conduction period. This audio signal therefore determines the anode potential, and because the anode is coupled to the grid of the opposing tube, it affects the grid potential in the blocked tube during its non-conduction period and correspondingly advances or delays the time at which its grid reaches a conduction level. As a result of the inversion in tube 1, an audio voltage applied to the grid of tube 1 will have the reverse effect in tube 2 under the circumstances described. For instance, if the non-conducting period of tube 1 is increased, the non-conducting period of tube 2 is decreased. This corresponds to a decrease in the conducting period of tube 1, which constitutes a variation in the pulse width and simultaneously compensates the first effect to offset the frequency modulation that would be produced thereby.

An audio signal supplied by microphone 20 is amplified in tube 22 and placed on grid 3 of tube 1 through resistance 17.

The repetition rate of output pulses 27 of Fig. 2 is substantially linearly proportional to the positive voltage appearing at the grid return; while the duration or width of the pulses 27 is unaffected by the grid bias as described. Accordingly, the repetition rate of the pulses appearing between points 23 and 24 will vary between the closely spaced pulses shown in region 30 of Fig. 3b and the widely spaced pulses of region 31.

The closely spaced pulses (region 30, Fig. 3b) occur at the positive peaks of the impressed audio voltage 32 (region 30', Fig. 3a). The widely spaced pulses (region 31, Fig. 3b) occurs at the negative peaks of audio voltage 32 (region 31', Fig. 3a. There is thus produced frequency modulation of pulses 27 by modulating signal 32 placed on the grid 3 of tube 1.

The percentage modulation varies with the instantaneous magnitude of the audio signal, while the frequency of the modulation is proportional to the frequency of the audio signal.

The frequency modulated, constant width pulses of Fig. 3b are applied through keyer 25 to transmitter 26 where they constitute the envelopes of the radiated waves.

Fig. 4 illustrates a receiving circuit for reproducing the audio signal components from the frequency modulated pulses emitted from transmitter 26 of Fig. 1. The radiant energy pulses are received in receiver-demodulator 40 where they are amplitude demodulated or rectified in the customary manner. If desired, receiver-demodulator 40 may contain pulse discriminator circuits selectively responding to pulse width characteristics. Circuits of this general type are disclosed in application Serial No. 479,625, of Luis W. Alvarez, for Radio beacon and system, filed March 18, 1943, and in applicattion Serial No. 506,275, of Luis W. Alvarez, for Radio beacon and discriminator circuit therefor, filed October 14, 1943. The inclusion of such circuits permits a number of carriers characterized by differing pulse widths to be used simultaneously in a common transmitting channel. In such multiplex systems manifestly the transmitted pulse width controlled by the time constant of resitsance 15-capacitor 11 (Fig. 1) will accord with that of the discriminator in the appropriate receiver. The output of receiver 40 delivered between terminals 41 and 42 consists of frequency modulated pulses substantially as shown in Fig. 3b. This frequency modulated pulse signal is applied to the input of low-pass filter 43 consisting of capacitors 44 and 45 and choke 46. The output of filter 43 is applied to grid 48 of audio amplifier tube 47, the output of which is fed to audio transformer 50 and thence to speaker 51. The waveform of Fig. 3b, placed on the input of low-pass filter 43, contains high frequency components, and a complex audio component shown in Fig. 3a. The wave of Fig. 3a is a reproduction of the original signal supplied by microphone 20 of Fig. 1. Low-pass filter 43 prevents transmission of all high frequency components and passes only the modulating audio frequency. This audio frequency voltage is amplified in tube 47 and applied to speaker 51.

The invention described herein may be manufactured and used by or for the Government of the United States of America for governmental purposes without the payment of any royalties thereon or therefor.

I claim:

1. A variable frequency electronic multivibrator comprising a first tube having anode, grid and cathode, a second tube having anode, grid and cathode, the anode of said first tube being capacitively coupled to the grid of said second tube and the anode of said second tube being capacitively coupled to the grid of said first tube, an impedance connecting the grid and the cathode of said first tube, energy supplying means for producing alternate pulses of current through said tubes, a positive voltage bias connected between the grid and cathode of said first tube through an impedance, and means for impressing on the grid of said first tube a variable voltage for controlling the repetition rate of said pulses of current through said first tube while retaining constant duration of said pulses, and impedance means connecting the grid of said second tube to a point of fixed grid return potential.

2. The method of generating, at variably spaced intervals, uniform impulses of current in a vacuum tube having a grid and capable of being cyclicly blocked and unblocked comprising applying a variable positive voltage to a grid of a blocked vacuum tube to raise the grid potential and unblock the tube, applying an abrupt positive impulse to the grid when the tube unblocks to drive the tube to saturation, and applying a negative voltage to the grid a fixed time thereafter while the tube is substantially in saturation to drive the tube from saturation to below cutoff, thereby blocking the tube.

3. A method of cyclicly generating pulses in a tube having a control electrode and capable of being blocked and unblocked comprising the steps of applying an abrupt positive voltage to the control electrode of a tube when the tube is starting to unblock to initiate an abrupt increase in the tube current, generating a fixed time after the abrupt current increase an abrupt negative voltage of fixed amplitude, applying said abrupt negative voltage to the control electrode to initiate a blocked interval, and biasing the control electrode toward a controllably variable positive voltage to determine the duration of the blocked interval and the time of institution of the unblocked interval.

CARL HARRISON SMITH, Jr.

REFERENCES CITED

The following references are of record in the file of this patent:

UNITED STATES PATENTS

| Number | Name | Date |
| --- | --- | --- |
| 2,266,401 | Reeves | Dec. 16, 1941 |
| 2,280,693 | Evans | Apr. 21, 1942 |
| 2,297,926 | Usselman | Oct. 6, 1942 |
| 2,338,395 | Bertelink | Jan. 4, 1944 |
| 2,338,512 | Harmon | Jan. 4, 1944 |

FOREIGN PATENTS

| Number | Country | Date |
| --- | --- | --- |
| 118,054 | Australia | Feb. 3, 1944 |